April 7, 1959  W. H. FUSS  2,880,949
CONDUIT SUPPORT ASSEMBLY
Filed Jan. 18, 1957
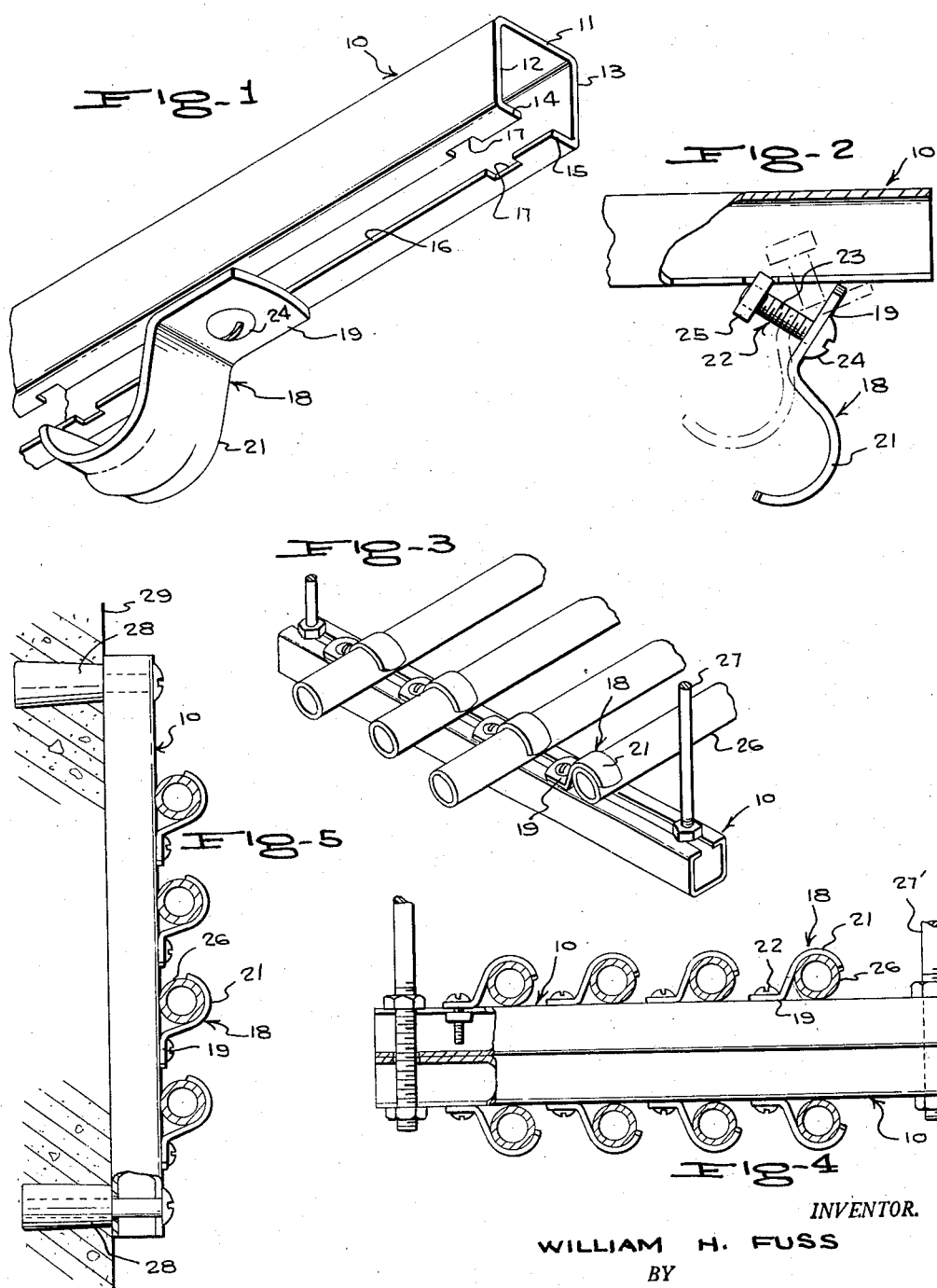
INVENTOR.
WILLIAM H. FUSS
BY
McMorrow, Berman + Davidson
ATTORNEYS

2,880,949
CONDUIT SUPPORT ASSEMBLY

William H. Fuss, Stone Mountain, Ga.

Application January 18, 1957, Serial No. 634,857

3 Claims. (Cl. 248—70)

The present invention relates to an assembly for supporting a conduit on a supporting surface of a building.

An object of the present invention is to provide a conduit support assembly which lends itself to rapid and easy attachment to a wall surface of a building.

Another object of the present invention is to provide a conduit support assembly which enables the ready attachment of a conduit to the assembly when secured to a wall surface of a building.

A further object of the present invention is to provide a conduit support assembly which uses common fastening elements of universal application.

A still further object of the present invention is to provide a conduit support assembly which is sturdy in construction, simple in structure, and one economical to manufacture.

These and other objects and advantages of the present invention will be fully apparent from the following description when taken in connection with the annexed drawing, in which:

Figure 1 is a perspective view of one end portion of the conduit support assembly, according to the present invention, Figure 2 is a partial sectional view showing how the nut and bolt shank of a conduit hanger is inserted within the housing of the present invention, Figure 3 is a perspective view, on a reduced scale, of the housing shown in Figure 1, showing it in a trapeze-type conduit support assembly, Figure 4 is an elevational view partially in section showing a double trapeze-type support assembly using the components of the present invention, and Figure 5 is an end view of a plurality of conduits supported by the assembly of the present invention and attached to a vertical wall surface.

Referring in greater detail to the drawing in which like numerals indicate like parts throughout the several views, the conduit support assembly, according to the present invention, comprises an elongated housing designated generally by the reference numeral 10 and having a web 11 and a pair of legs 12 and 13 arranged in spaced relation projecting from one side of the web 11. Flanges 14 and 15 extend parallel to the web 11 and project inwardly from the free end of the legs 12 and 13 respectively.

The flanges 14 and 15 are spaced from each other and form therebetween an elongated slot designated generally by the reference numeral 16. Each flange 14 and 15 is provided with a plurality of notches 17 arranged in spaced relation therealong. The notches of the one flange 14 are in registry with an adjacent notch of the flange 15. The notches 17 of each of the flanges 14 and 15 form, with the adjacent part of the slot 16, an insertion and withdrawal opening.

A conduit hanger, designated generally by the reference numeral 18, has a plate portion 19 and a hook 21 projecting from one end of the plate portion 19. A bolt 22, having a shank 23, extends loosely through an aperture provided in the plate portion 19 of the conduit hanger 18 and has on one end a head 24 in engagement with one face of the plate portion 19. The other end of the bolt 22 is spaced from the other face of the plate portion 19. A nut 25 is rotatably mounted upon and is in threaded engagement with the portion of the bolt shank 23 adjacent the other end thereof.

As shown in Figure 2, the length of the opening formed by the notches 17 and the adjacent part of the slot 16 is less than the length of either face of the nut 25, and the nut 25 is insertable through and withdrawable from the opening into the housing 10 when the edge of the nut is at an angle to the flanges 14 and 15, as shown in full lines.

In use, after insertion within the housing 10, the bolt 22 may be turned, as shown in dotted lines in Figure 2, to a position in which one face of the nut 25 faces and abuts the inner surfaces of the portion of the flanges 14 and 15 adjacent the slot 16, such a position being shown in full lines in Figure 4. The bolt 22 may then be turned in the nut 25 to bring the hook 21 to the position shown in Figures 1, and 3 to 5 inclusive, in which the plate portion 19 abuts the flanges 14 and 15 and bridges the slot 16 and the hook 21 faces the flanges 14 and 15 to provide a support for a conduit, such conduit being designated generally by the reference numeral 26 in Figures 3 to 5 inclusive.

The nut 25 and bolt shank 23, after insertion into the housing 10, are movable along the slot 16 as a unit to an adjacent portion of the slot 16 with the hook 21 facing and spaced from the flanges 14 and 15, such a position including one which bridges any one of the openings formed by the notches 17 and the adjacent part of the slot 16, due to the relatively narrow opening thus formed and the greater size of the nut 25.

Vertically extending rods 27 and 27' may be provided with the conduit support assembly of the present invention for supporting a plurality of conduits 26 in trapeze-type support assemblies, either a single assembly, as shown in Figure 3, or a double one, as shown in Figure 4, in which two housings 10 are arranged with their webs 11 in face to face abutting engagement. The housing 10 may also be fixed, by means of expansion bolt wall plug assemblies 28 to a vertically extending wall surface 29, as shown in Figure 5.

It will be seen, therefore, that the conduit support assembly, according to the present invention, will have universal application in the support of pipes, conduits or cables to any supporting structure in a variety of ways. Common pipe clamps and common nut and bolt assemblies may be used with the housing 10 of the conduit support assembly and will provide an interchangeable fastening means having great utility, and permitting the individual attachment and detachment of any one conduit 26 without disturbing the position or securement of the other conduits 26 in any arrangement of supported conduits.

What is claimed is:

1. A conduit support assembly comprising an elongated hollow housing having a web, a pair of legs arranged in spaced relation projecting from one side of said web, a flange extending parallel to said web and projecting inwardly from the free end of each of said legs, said flanges being spaced from each other and forming therebetween a slot, each flange having a plurality of notches arranged in spaced relation therealong, each of the notches of one of said flanges being in registry with an adjacent notch of the other of said flanges and forming with the adjacent part of said slot an insertion and withdrawal opening, a conduit hanger having a plate portion, a hook projecting from one end of said plate portion, a bolt having a shank extending loosely through said plate portion and having on one end a head in engagement with one face of said plate portion and having the other end spaced from the other face of said plate portion, and a nut in threaded engagement with the portion of the bolt adjacent the other end, said nut and bolt shank of said hanger when positioned so that the edge of said nut is at an angle to said flange being insertable through and withdrawable from said opening.

2. A conduit support assembly comprising an elongated hollow housing having a web, a pair of legs arranged in spaced relation projecting from one side of said web, a flange extending parallel to said web and projecting inwardly from the free end of each of said legs, said flanges being spaced from each other and forming therebetween an elongated slot, each flange having a plurality of notches arranged in spaced relation therealong, each of the notches of one of said flanges being in registry with an adjacent notch of the other of said flanges and forming with the adjacent part of said slot an insertion and withdrawal opening, a conduit hanger having a plate portion, a hook projecting from one end of said plate portion, a bolt having a shank extending loosely through said plate portion and having on one end a head in engagement with one face of said plate portion and having the other end spaced from the other face of said plate portion, and a nut in threaded engagement with the portion of said bolt adjacent the other end, said nut and bolt shank of said hanger, when positioned so that the edge of the nut is at an angle to said flanges being insertable through said opening into the housing and after insertion being movable into an adjacent portion of said slot with the hook of said hanger facing and spaced from said flanges.

3. A conduit support assembly comprising an elongated hollow housing having a web, a pair of legs arranged in spaced relation projecting from one side of said web, a flange extending parallel to said web and projecting inwardly from the free end of each of said legs, said flanges being spaced from each other and forming therebetween an elongated slot, each flange having a plurality of notches arranged in spaced relation therealong, each of the notches of one of said flanges being in registry with an adjacent notch of the other of said flanges and forming with the adjacent part of said slot an insertion and withdrawal opening, a conduit hanger having a plate portion, a hook projecting from one end of said plate portion, a bolt having a shank extending loosely through said plate portion and having on one end a head in engagement with one face of said plate portion and having the other end spaced from the other face of said plate portion, and a nut in threaded engagement with the portion of said bolt adjacent the other end, said nut and bolt shank of said hanger, when positioned so that the edge of the nut is at an angle to said flanges being insertable through said opening into the housing and after insertion being movable into an adjacent portion of said slot with the hook of said hanger facing and spaced from said flanges, each of said openings having a length less than the length of one of the faces of said nut when said nut and bolt shank has been inserted into said housing through said opening and moved from the position in which said nut edge is at an angle to said flanges to a position with said one face of said nut facing said flanges whereby said hanger may be moved to a position with said nut selectively bridging any one of said openings.

References Cited in the file of this patent

UNITED STATES PATENTS

| 2,375,513 | Bach | May 8, 1945 |
| 2,512,108 | Liptay | June 20, 1950 |

FOREIGN PATENTS

| 139,495 | Sweden | Mar. 10, 1953 |